Patented Mar. 27, 1934

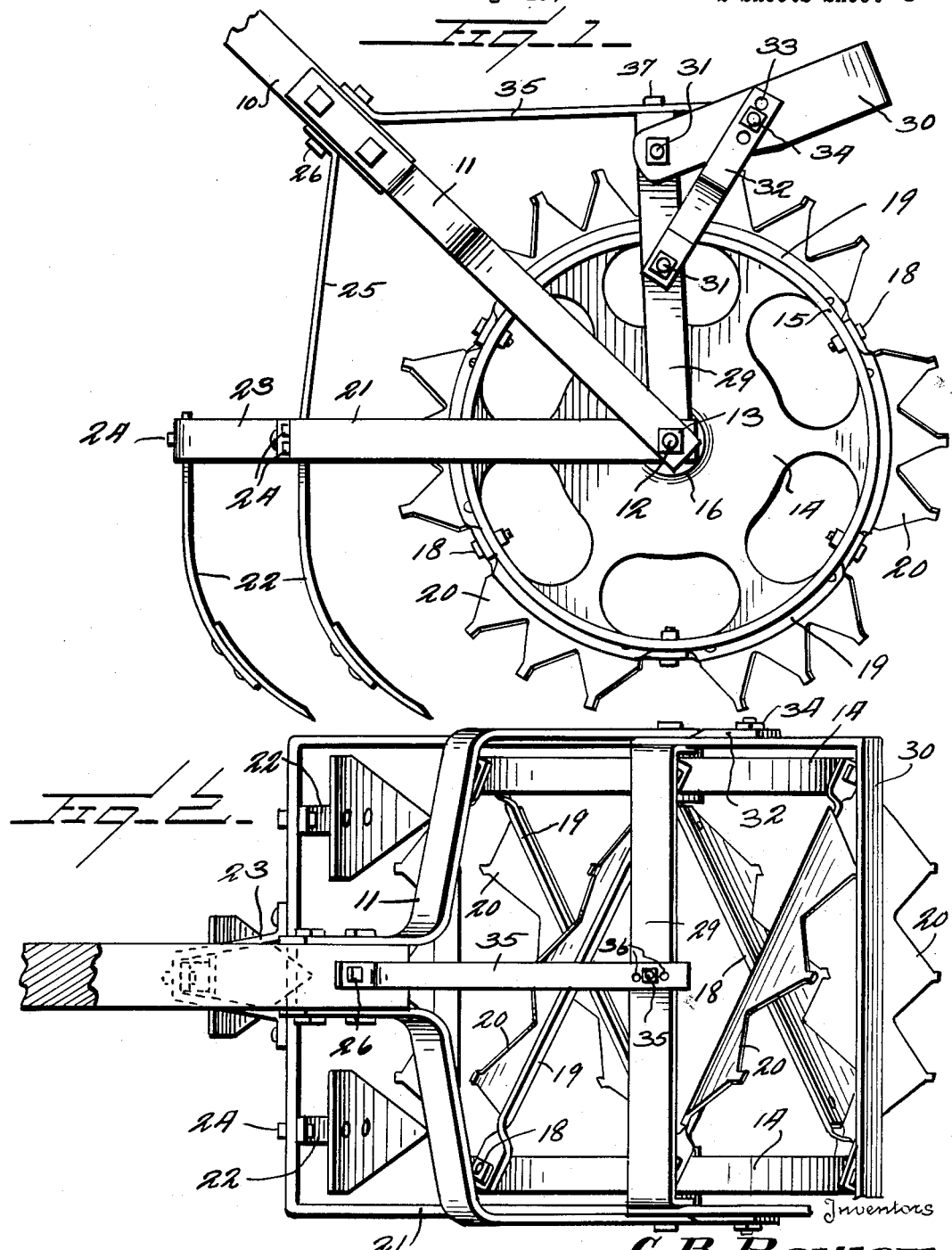

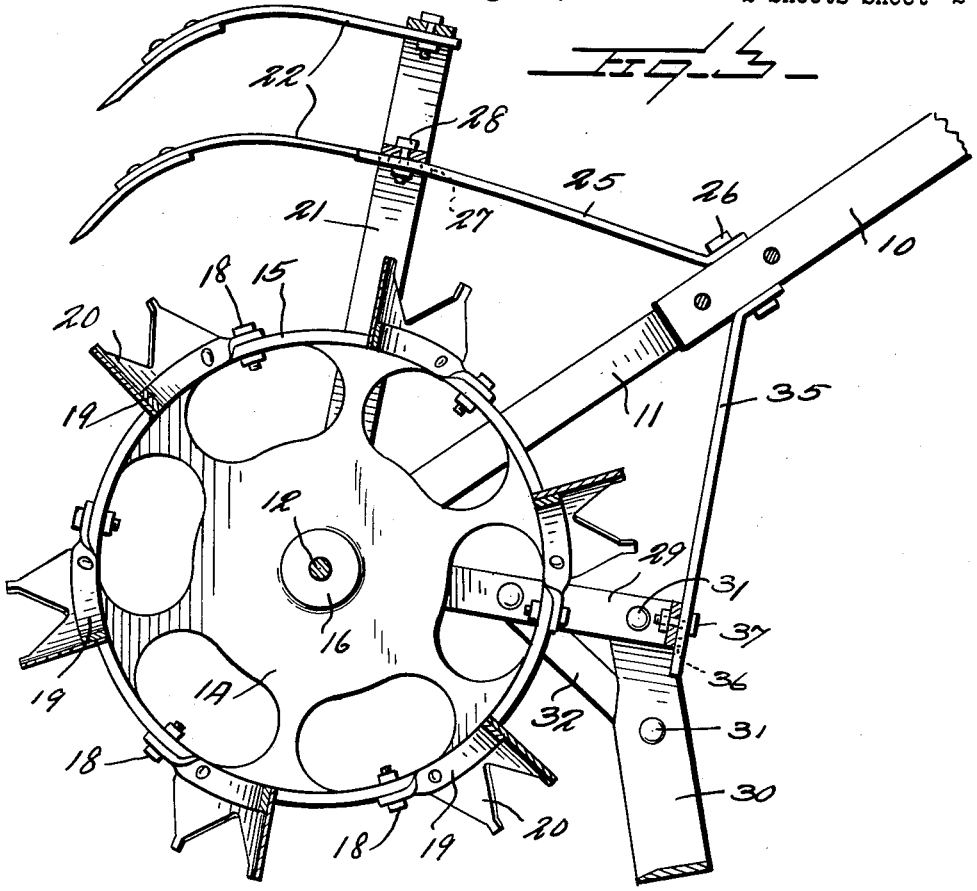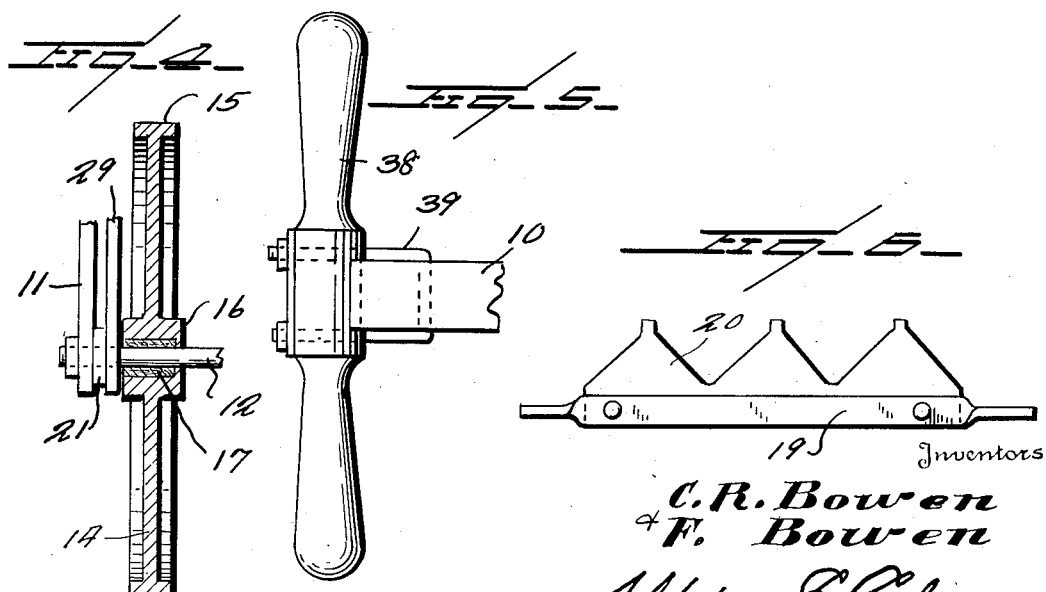

1,952,651

UNITED STATES PATENT OFFICE 1,952,651

COMBINED PULVERIZER AND WEEDER

Carl R. Bowen and Frank Bowen, What Cheer, Iowa

Application August 19, 1933, Serial No. 685,940

5 Claims. (Cl. 97—52)

This invention relates to implements for cultivating the ground and particularly to a hand operated combined pulverizer and weeder.

The general object of this invention is to provide in one implement a device for weeding and a device for cultivating and pulverizing the ground and more particularly to provide a structure having pulverizing wheels and a set of cultivator teeth and a weeding knife, the cultivator teeth of the weeding knife being so mounted upon the wheels that upon the handle being reversed, the cultivator teeth are lifted from the ground and the weeding knife placed in coactive relation to the ground or by a reverse movement of the handle the weeding blade, is raised and the cultivator teeth disposed in coactive relation to the ground.

Other objects will appear in the course of the following description.

Our invention is illustrated in the accompanying drawings, wherein:—

Figure 1 is a side elevation of my implement arranged as a cultivator;

Figure 2 is a plan view of the structure shown in Figure 1;

Figure 3 is a vertical sectional view with the structure arranged as a weeder;

Figure 4 is a diametric section through one of the wheels;

Figure 5 is a fragmentary plan view of the handle and grip;

Figure 6 is a plan view of one of the sets of pulverizing teeth.

Referring to these drawings, 10 designates a handle such as is used on lawn mowers and like implements and having attached to its lower end the outwardly and forwardly extending metallic yokes 11. Passing through the extremities of these yokes is a bolt 12 provided with nuts 13 at its outer ends which bear against the outer faces of the yokes. Mounted upon this bolt for rotation therearound are the wheels 14, each of these wheels having spokes and an outer rim 15 and a hub 16. The hub 16 as shown in Figure 4 is counter-sunk or counter-bored to receive the wooden bushing 17. Any other suitable bearing may be used, however, but we have found that by using wooden bushings, no lubrication is required. These wooden bushings may be retained in place within the hubs of the wheels in any suitable manner.

Attached to the rims 15 of the wheels and extending transversely between the wheels but at an inclination relative to the circumference thereof are the tooth supporting strips 19, these strips carrying between the wheels the sets of teeth 20, these teeth being triangular in form and each set of teeth being riveted to its corresponding strap or strip 19. These strips 19 are twisted at their middles so that while the ends of the strips lie flat against the rims of the wheels, the central portion of each strip is disposed radially so that the teeth 19 project radially but are disposed diagonally with reference to the planes of the wheels. The extremities of the strips 19 are bolted to the rims of the wheels so that they may be removed to permit new sets of teeth to be disposed on the strips whenever desired. These strips 19 hold the wheels apart, though other means might be used for this purpose. These teeth are used in puverizing the ground.

The shaft 12 passes through the ends of an approximately U-shaped yoke 21 which carries upon it the cultivator teeth 22. The middle portion of the yoke is provided with a U-shaped extension 23 and one cultivator tooth 22 is mounted within this extension while the other cultivator teeth 22 are mounted on either side of this extension. The shank of the middle cultivator tooth is held from lateral movement in the U-shaped extension 23 and is held by a similar bolt 24 passing through the shank and through the end of the U-shaped extension. The other teeth 22, however, are held in place by two bolts 24 so as to prevent any lateral movement. The yoke 21 is supported from the handle and held in an angular relation to the handle by means of the brace 25 which at its inner end is angularly bent and bolted to the handle by a bolt 26 and at its other end is provided with a plurality of apertures 27 through which a bolt 28 passes into the yoke. Thus the angular position of the handle with relation to the position of the yoke 21 may be adjusted. The bolt 12 also passes through the ends of a yoke 29 which is U-shaped and to the outer end of this yoke is attached the U-shaped blade 30 which constitutes a weeding knife having two upturned ends which at their extremities are bolted to the yoke 29 by the bolts 31. Diagonal braces 32 are bolted to the yoke 29 and the outer ends of these braces are provided with a plurality of holes 33 through any one of which a bolt 34 may pass so that the angular relation of the U-shaped weeding blade may be adjusted with relation to the legs of the yoke 29. The yoke 29 is also braced from the handle by means of the brace 35, this brace being bolted to the handle and at its end being provided with a plurality of perforations 36 through which a bolt 37 passes. Thus the angular relation of the handle to this yoke may be adjusted. Thus the handle is adjustable to higher or lower positions. The ends of the yokes 21 and 29 are disposed between the hubs of the wheels and the ends of the yoke pieces 11.

The cultivator shovels which form the lower ends of the cultivator teeth are preferably made of a high grade of steel 3 inches wide by 3½ inches long and secured to their shanks by rivets. The shovels and shanks are downwardly and forwardly curved. This cultivator assembly is adjustable for height and depth by the supporting strap or brace 25. The weeder knife 30 is made of steel and the cutting edge is ground and polished. The blade is adjustable for height and depth by the adjusting strap or brace 33 and the blade, as will be seen, is adjustable for pitch either forwardly or rearwardly by means of the adjusting braces 32. The blade is so disposed as to function with a minimum of effort on the part of the operator. The cross bars 19 are of mill steel and the knives or blades 20 are also of mill steel and are riveted to these cross bars. These pulverizer bars with their knives are, therefore, detachable from the wheels and are interchangeable without dismounting the rest of the machine. The blades are formed with three teeth and these teeth are V-shaped in form and will completely cut a clod or hard piece of ground in half and completely break the upper crust of the ground.

The pulverizers operate efficiently and continuously whether the implement is in cultivating or weeding position. The blades 20 of the pulverizer are flattened at the points to let them enter the ground relatively easily. They will enter the ground about two inches or deeper depending on ground conditions. It will be seen the wheels with the pulverizing blades secured thereto constitute a pulverizing drum.

The handle 10 is provided at its upper end with a transversely extending grip 38 held in place upon the handle by a U-bolt 39, the bight of which passes through the handle 10, the two legs extending upward through the cross bar grip 38 and being provided at their ends with nuts.

It will be seen that we have provided a cultivating implement for gardens which is relatively light and which is very effective and that we provide a machine which not only tears up the ground but plows it so that the ground is thoroughly pulverized and worked by merely pushing the machine forward and that then weeds may be cut and pulled out of the ground by reversing the handle and using the weed blades 30.

While we have illustrated certain details of construction and certain arrangements of parts, we do not wish to be limited thereto as these might be varied in many ways without departing from the spirit of the invention as defined in the appended claims.

We claim:—

1. A cultivating implement of the character described comprising a cultivating drum having an axle and having a plurality of sets of diagonally disposed teeth projecting from the drum and adapted to engage the ground, a handle having a fork at one end embracing the drum and pivotally connected to the axle of the drum, a U-shaped yoke pivotally connected to the axle of the drum and disposed on one side of the handle, a U-shaped yoke pivotally connected to the axle of the drum and disposed on the other side of the handle, means adjustably connecting said yokes to the handle, cultivator shovels detachably connected to one of said yokes, and a U-shaped weeding blade connected to the other of said yokes and extending in angular relation thereto.

2. A cultivating implement of the character described comprising a cultivating drum having an axle and having a plurality of sets of diagonally disposed teeth projecting from the drum and adapted to engage the ground, a handle having a fork at one end embracing the drum and pivotally connected to the axle of the drum, a U-shaped yoke pivotally connected to the drum and disposed on one side of the handle, a U-shaped yoke pivotally connected to the axle of the drum and disposed on the other side of the handle, means adjustably connecting said yokes to the handle, cultivator shovels detachably connected to one of said yokes, and a U-shaped weeding blade connected to the other of said yokes and extending in angular relation thereto, and means for holding the U-shaped weeding blade in any one of a plurality of angularly adjusted relations to the yoke thereof.

3. A cultivating implement of the character described including a pair of wheels, a bolt extending through the wheels, diagonally disposed bars connecting the rims of the wheels to each other, the bars carrying outwardly projecting pulverizing teeth, a handle having a fork at its lower end embracing said wheels and through the ends of which fork the wheel bolt passes, a U-shaped yoke connected at its ends to said wheel bolt, the yoke having a middle extension, cultivator shovels having their shanks detachably engaged with said yokes and with said middle extension, a second U-shaped yoke embracing the wheels and pivotally connected to the extremities of the wheel bolt and disposed on the opposite side of the handle from the first named yoke and carrying a U-shaped weed cutting blade disposed at an angle to the yoke, and braces engaged with the handle and extending in opposite directions and adjustably engaged with the two yokes.

4. A cultivating implement of the character described comprising a pair of wheels, a bolt passing through the hubs of the wheels, diagonally arranged bars connecting the rims of the wheels and having outwardly projecting V-shaped teeth carried thereon, a U-shaped yoke through the ends of which said first named bolt passes and disposed on one side of the handle, a second U-shaped yoke through the ends of which the first named bolt passes and disposed on the other side of the handle, braces connecting the yokes to the handle, cultivator implements attached to one of said yokes and depending therefrom, and a weeding implement attached to the other of said yokes and depending therefrom.

5. A cultivating implement of the character described, including two spaced wheels, a bolt constituting an axle and passing through the hubs of the wheels, bars extending diagonally across the space between the wheels and detachably connected to the wheels, said bars carrying outwardly projecting teeth, a handle, irons attached on each side of the handle and extending outward and downward and through which the bolt passes, a U-shaped yoke through the ends of which said bolt passes, cultivator shovels having their shanks connected to said last named yoke, a second U-shaped yoke through the ends of which the bolt passes, a U-shaped weeding blade detachably bolted to the second named yoke at the outer end thereof, the blade extending approximately at a right angle to the yoke, a brace extending between said blade and the legs of the yoke, the blade being adjustably connected to the brace, and braces connecting each of said yokes to the handle, each of said braces being adjustably connected to its corresponding yoke.

CARL BOWEN.
FRANK BOWEN.